(12) United States Patent
Thapliyal et al.

(10) Patent No.: US 9,779,389 B2
(45) Date of Patent: Oct. 3, 2017

(54) GENERATION OF SCREENSHOTS FOR A VISUAL SUMMARY OF AN ONLINE MEETING UNDER DIVERSE AND/OR VARYING NETWORK AND/OR CLIENT COMPUTER PERFORMANCE CONDITIONS

(71) Applicant: GetGo, Inc., Boston, MA (US)

(72) Inventors: Ashish V. Thapliyal, Santa Barbara, CA (US); Nikolay Avrionov, Santa Barbara, CA (US)

(73) Assignee: GetGo, Inc., Boston, MA (US)

( * ) Notice: Subject to any disclaimer, the term of this patent is extended or adjusted under 35 U.S.C. 154(b) by 188 days.

(21) Appl. No.: 14/666,907

(22) Filed: Mar. 24, 2015

(65) Prior Publication Data

US 2016/0283586 A1 Sep. 29, 2016

(51) Int. Cl.
| | |
|---|---|
| *G06F 17/00* | (2006.01) |
| *G06Q 10/10* | (2012.01) |
| *G06F 17/30* | (2006.01) |
| *H04L 12/26* | (2006.01) |

(52) U.S. Cl.
CPC ....... *G06Q 10/10* (2013.01); *G06F 17/30719* (2013.01); *H04L 43/04* (2013.01)

(58) Field of Classification Search
CPC ......... G06F 17/30719; G06F 17/30896; H04L 43/04; H04L 43/16
USPC .................................................. 715/200, 255
See application file for complete search history.

(56) References Cited

U.S. PATENT DOCUMENTS

| | | | | |
|---|---|---|---|---|
| 8,589,423 | B2 * | 11/2013 | Kern ................ | G06F 17/30259 463/31 |
| 8,922,617 | B2 * | 12/2014 | Alexandrov ........ | H04L 12/1831 348/14.08 |
| 9,282,289 | B2 * | 3/2016 | Alexandrov .......... | G06F 17/212 |
| 9,356,977 | B2 * | 5/2016 | Christiansen ....... | H04L 12/1831 |
| 9,449,303 | B2 * | 9/2016 | Underhill ............. | G06Q 10/10 |
| 9,559,906 | B2 * | 1/2017 | Keskkula ............. | H04L 41/145 |
| 2009/0083710 | A1 * | 3/2009 | Best ...................... | G06F 9/4446 717/120 |
| 2009/0244278 | A1 * | 10/2009 | Taneja .................. | G06Q 10/10 348/143 |
| 2012/0162349 | A1 | 6/2012 | Alexandrov et al. | |

(Continued)

OTHER PUBLICATIONS

Lu et al., An Enhanced Screen Codec for Live Lecture Broadcasting, IEEE 2010, pp. 108-114.*

(Continued)

*Primary Examiner* — Cong-Lac Huynh
(74) *Attorney, Agent, or Firm* — BainwoodHuang

(57) ABSTRACT

Screenshots are captured for a visual summary of an online meeting using a dynamically determined inactivity threshold time period. The inactivity threshold time period may be the sum of i) an average time interval between arrival times of screen update messages in a set of received screen update messages, and ii) a multiple of the standard deviation of such time intervals. If no significant updates to a shared screen occur during the inactivity threshold time period, a screenshot may be captured for the online meeting visual summary. A premature screenshot threshold time period may also be determined. If significant visual data is received during the premature screenshot threshold time period, the previously captured screenshot is replaced with an updated screenshot.

15 Claims, 6 Drawing Sheets

(56) References Cited

U.S. PATENT DOCUMENTS

| | | | | |
|---|---|---|---|---|
| 2012/0166545 | A1* | 6/2012 | Alexandrov | G06Q 10/10 709/205 |
| 2012/0166952 | A1* | 6/2012 | Alexandrov | G06Q 10/101 715/730 |
| 2013/0113804 | A1* | 5/2013 | Ferman | G06T 11/206 345/440 |
| 2013/0258042 | A1* | 10/2013 | Shun | H04L 67/22 348/14.08 |
| 2014/0208211 | A1* | 7/2014 | Luo | G06Q 10/10 715/730 |
| 2015/0049087 | A1* | 2/2015 | Chaturvedi | G06T 11/206 345/440 |
| 2015/0067026 | A1* | 3/2015 | Christiansen | H04L 12/1831 709/203 |
| 2015/0181020 | A1* | 6/2015 | Fitzsimmons | H04M 3/42221 379/67.1 |
| 2016/0133297 | A1* | 5/2016 | Thornton | G11B 27/06 386/230 |

OTHER PUBLICATIONS

Bannerman et al., Scrum Practice Mitigation of Global Software Development Coordination Challenges: A Distinctive Advantage?, IEEE 2012, pp. 5309-5318.*

Ryba et al., Dynamic Distributed Learning for Graduate Training in School Psychology at the Uninversity of Calgary, Google 2008, pp. 19-32 (within pp. 1-45).*

* cited by examiner

GENERATION OF SCREENSHOTS FOR A VISUAL SUMMARY OF AN ONLINE MEETING UNDER DIVERSE AND/OR VARYING NETWORK AND/OR CLIENT COMPUTER PERFORMANCE CONDITIONS

BACKGROUND

Existing technologies have been developed that collect a subset of visual data from an online meeting for later use. For example, some existing systems extract visual data from an online meeting, and the extracted visual data is subsequently used to identify specific points within the meeting when navigating through a stored copy of the meeting. Some previous systems have extracted visual data representing points in time within an online meeting as the meeting is being presented, and displayed representations of the extracted visual data to meeting attendees during the online meeting.

In these existing systems, fixed delay periods have been imposed at certain points during the extraction of visual data from the online meeting. In some cases, the fixed delays have been used to prevent visual data extraction events from occurring too rapidly, in order to limit the total number of visual data extraction operations, and to limit the total amount of visual data captured for use in the visual summary.

SUMMARY

Significant shortcomings have arisen in previous systems related to the use of fixed delay periods when capturing screenshots for a visual summary. First, different online meeting participants, which may include human users as well as server systems recording and/or generating a summary of the online meeting, may experience different network performance based on the capabilities of and/or loads on the networks through which they connect to the online meeting. Similarly, different online meeting participants may connect to the meeting using client systems with diverse and/or varying performance characteristics. As a result, visual data for an online meeting may be received and processed at a wide range of different speeds. These differences in network and system performance create problems when setting values for the fixed delay periods used in previous systems. For example, if a relatively short fixed time delay is imposed before extracting visual data following detection of a change in the online meeting visual data, visual data may be extracted prior to completion of the detected change, especially in the face of relatively poor network performance, and/or when experiencing limited resource availability on a participant's local system. Such conditions may result in extracting a transitional or incomplete set of visual data. On the other hand, if a relatively long fixed delay is imposed following a change in the online meeting visual data, a user experiencing fast network performance, and/or with high execution speed on their local system, may perceive a long time delay between initial display of visual data within a live meeting portion of the user interface, and the subsequent display of the corresponding extracted visual data within a simultaneously displayed visual summary of the meeting.

To address the above described and other shortcomings of previous technologies, a new system is disclosed that dynamically determines an inactivity threshold and/or premature screenshot threshold while capturing screenshots for a visual summary of an online meeting. When a screenshot is to be captured, for example in response to detecting a trigger condition, the system determines an inactivity threshold time period. In one embodiment, the disclosed system determines a new inactivity threshold following each subsequently received screen update message. A trigger condition for a screen capture, may, for example, include or consist of detecting a significant change in a shared screen being provided to meeting participants during the online meeting.

The disclosed system determines an inactivity threshold time period by determining an average time interval occurring between the arrival times of previously received screen update messages, within a set of screen update messages received after the trigger condition. The disclosed system sets the inactivity threshold to a value that is larger than that average time interval. In one embodiment, the system determines the standard deviation of the time intervals occurring between the arrival times of the screen update messages in the set, and determines an inactivity threshold that is the sum of i) the average time interval between arrival times of the screen update messages in the set, and ii) a multiple of the standard deviation of the time intervals between the arrival times of the screen update messages in the set.

The disclosed system determines whether a significant visual change occurs during the inactivity threshold time period. For example, in one embodiment, the disclosed system determines whether any screen update messages are received during the inactivity threshold time period. If not, the system captures a screenshot to be used as part of the visual summary of the meeting.

In another aspect, the disclosed system operates to detect when a premature screenshot may have been captured. Even when the disclosed system waits until after the dynamically determined inactivity threshold time period passes prior to capturing a screenshot, under some circumstances the captured screenshot may still include or consist of transitional visual data, i.e. visual data representing a point in time within the online meeting at which a change in the online meeting visual data has not yet completed. Accordingly, in order to determine whether a screenshot was captured prematurely, the disclosed system determines whether a significant amount of visual data is received for the online meeting during a time period referred to as the premature screenshot threshold time period.

If significant visual data for the shared screen is received during the premature screenshot threshold time period, the system determines that the previous screenshot was captured prematurely. If the previously captured screenshot was captured prematurely, the system restarts the screenshot capture process in order to capture a new screenshot that is then used to replace the premature screenshot in the visual summary.

In a first embodiment, the premature screenshot threshold time period follows the time at which a screenshot was captured. In this embodiment, the duration of the premature screenshot threshold time period (i.e. the premature screenshot threshold) may be set to a constant amount of time (e.g. 10 seconds), or may be set to a value based on a constant amount of time, a multiple of the average time interval between arrival times of the screen update messages in the set of previously received screen update messages, and/or a multiple of the standard deviation of the time intervals between the arrival times of the screen update messages in the set of previously received screen update messages.

In an alternative embodiment, the premature screenshot threshold time period may run concurrently with the inactivity threshold time period. In this alternative embodiment, the premature screenshot threshold time period must be greater than the duration of the inactivity threshold time period. In this alternative embodiment, the premature screenshot threshold may, for example, be determined as a sum of i) the average time interval occurring between the arrival times of the set of previously received screen update messages, and ii) a multiple of the standard deviation of the time intervals occurring between the arrival times of the screen update messages in the set. However, because the duration of the premature threshold time period in this alternative embodiment must be greater than the duration of the inactivity threshold time period, the multiple of standard deviations used to determine the premature screenshot threshold time period is larger than the multiple of standard deviations used to determine the inactivity threshold.

The disclosed system addresses various shortcomings arising in previous technical solutions, including shortcomings arising from the use of fixed delay periods while capturing screenshots for use in visual summaries of online meetings. The disclosed system may provide improved screenshot capture and display for online meeting participants connecting through networks having varied and/or varying performance levels, and/or with end user systems having varied and/or varying performance characteristics. The disclosed system accomplishes these improvements by dynamically determining delay periods for use when capturing screenshots based on the arrival times of screen update messages.

Embodiments of the disclosed system address specific shortcomings of previous solutions related to setting or selecting appropriate values for the fixed delay periods used in previous systems. For example, the disclosed system may reduce or eliminate problems arising from using relatively short fixed time delays, such as extracting visual data prior to completion of a change in the visual data, as may occur in previous systems under conditions of poor network performance, and/or when experiencing limited resource availability on a participant's local client system. Additionally, the disclosed system may reduce or eliminate problems arising from using relatively long fixed time delays, such as capturing and displaying screenshots long after the corresponding visual data was displayed as part of the live online meeting, as may occur in previous systems under conditions of relatively high network and/or client system performance.

Embodiments of the disclosed system may also improve over previous solutions by detecting the premature capture of a screenshot. The disclosed system accordingly allows a premature screenshot to be detected and replaced with a correctly captured screenshot.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
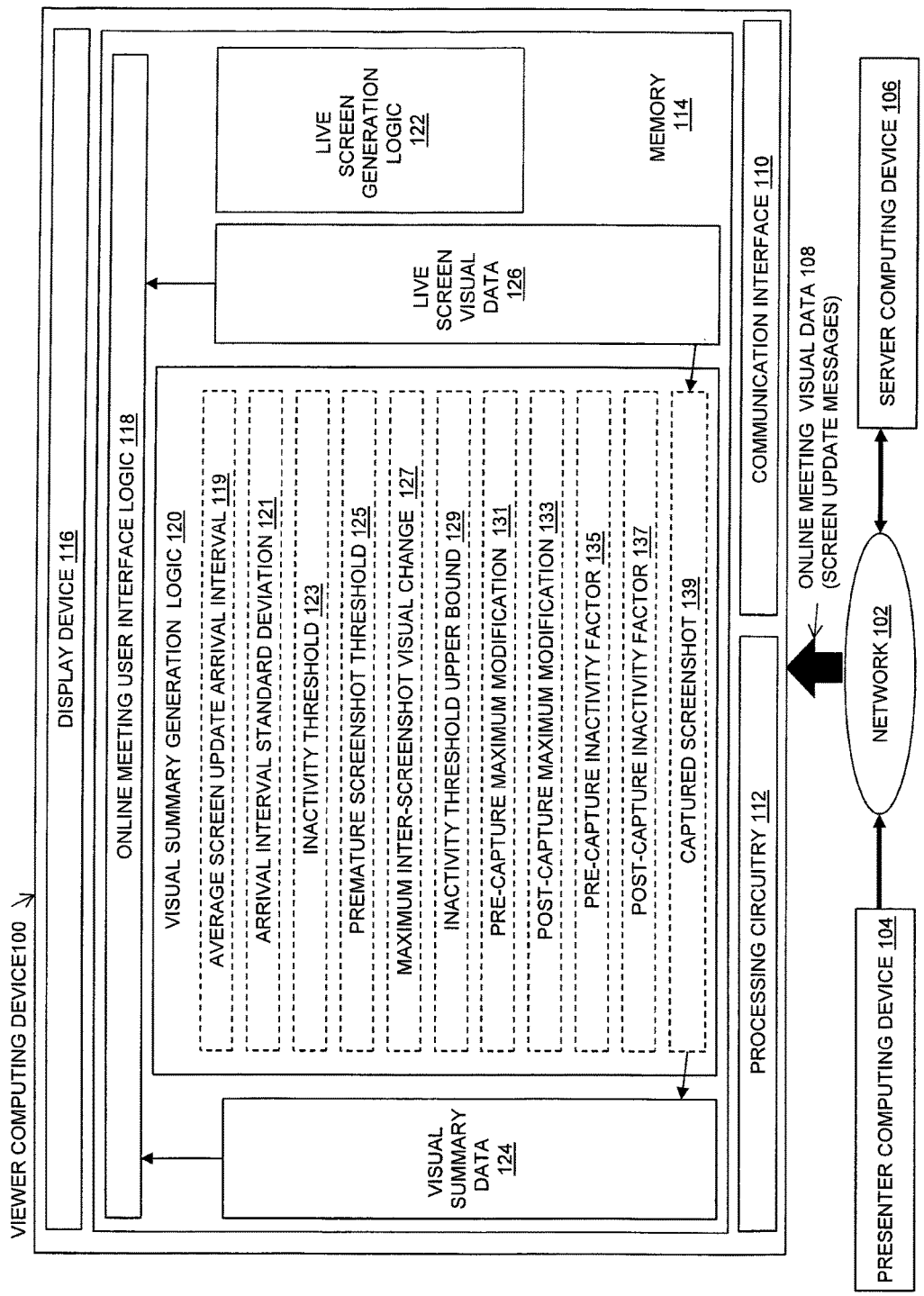
FIG. 1 is a block diagram showing components in an example of an execution environment including an illustrative embodiment of the disclosed system.

As shown in FIG. 1, in an example of an execution environment for an illustrative embodiment of the disclosed system, a Viewer Computing Device 100, a Presenter Computing Device 104, and a Server Computing Device 106 are communicably coupled to a Network 102. The Viewer Computing Device 100 includes a Communication Interface 110, Processing Circuitry 112, Memory 114, and a Display Device 116. Display Device 116 may include or consist of any specific type of output device operable to present information in visual form, such as a computer monitor or other type of electronic visual display. Communication Interface 110 may, for example, include or consist of one or more network interface cards (NICs) or the like. Processing Circuitry 112 may, for example, include or consist of one or more microprocessors or the like. Memory 114 may, for example, include or consist of any specific type of volatile or non-volatile semiconductor memory or the like that is operable to store programs (sequences of instructions) and/or data (e.g. program state information) for use in the Viewer Computing Device 100.

In the illustrative embodiment of FIG. 1, the Memory 114 stores program code for execution on the Processing Circuitry 112, such as application program code for providing an online meeting to an online meeting participant. The program code may include Visual Summary Generation Logic 120, Live Screen Generation Logic 122, and Online Meeting User Interface Logic 118. The Memory 114 further stores data generated by and/or used during the execution of the program code, including Visual Summary Data 124 and Live Screen Visual Data 126, as well as Average Screen Update Interval 119, Arrival Interval Standard Deviation 121, Inactivity Threshold 123, Premature Screenshot Threshold 125, Maximum Inter-Screenshot Visual Change 127, Inactivity Threshold Upper Bound 129, Pre-Capture Maximum Modification 131, Post-Capture Maximum Modification 133, Pre-Capture Inactivity Factor 135, Post-Capture Inactivity Factor 137, and Captured Screenshot 139.

During operation of the components shown in FIG. 1, on online meeting is provided between the Presenter Computing Device 104 and one or more viewer computing devices, including Viewer Computing Device 100. During the online meeting, desktop sharing is provided such that a shared screen is provided from the Presenter Computing Device 104 to the Viewer Computing Device 100. The shared screen may consist of or include a portion of the graphical user interface (e.g. a portion of a virtual desktop or the like) from the Presenter Computing Device 104. For example, visual data for a shared screen ("screen data") may be sent from the Presenter Computing Device 104 to the Server Computing Device 106, and then distributed from the Server Computing Device 106 to a number of viewer computer devices, including Viewer Computing Device 100. The Presenter Computing Device 104 may store presentation data in a local storage (e.g. memory), and transmit screen data including at least the visual content of the presentation data to one or more viewer computing devices, including Viewer Computing Device 100, via the Server Computing Device 106.

The visual content of the presentation data shared during the online meeting may include or represent various specific types of visual data. For example, the shared visual content may include one or more slides in a slideshow, a user interface of a separate software application being executed on the Presenter Computing Device 104 (e.g. as part of a demonstration of the other application), and/or other specific types of visual content that may be appropriate for a given online meeting.

In one embodiment, the shared screen provided during the online meeting is treated as an arrangement (e.g., an array) of tiles, each of which represents a particular area of the shared screen. For example, each tile within the shared screen may consist of a number of pixels located within a corresponding area of the shared screen. The screen data received by Viewer Computing Device 100 over Network 102 for the online meeting is shown as Online Meeting Visual Data 108. The Online Meeting Visual Data 108 consists of or includes a number of screen update messages received by Viewer Computing Device 100 from the Server Computing Device 106 over the Network 102. Each of the screen update messages received by Viewer Computing Device 100 contains and/or indicates pixel data or the like for one or more changed tiles within the shared screen. The changed tiles from the screen update messages received in the Online Meeting Visual Data 108 are used by Live Screen Generation Logic 122 to continuously update Live Screen Visual Data 126, so that Live Screen Visual Data 126 contains a current version of the visual contents of the online meeting during the online meeting, and so that Online Meeting User Interface Logic 118 can use Live Screen Visual Data 126 to generate a live shared screen portion of an online meeting user interface in the Display Device 116 during the online meeting.

Further during the live presentation of the visual content of the online meeting by the Online Meeting User Interface Logic 118 on Display Device 116, Visual Summary Generation Logic 120 creates a visual summary of the online meeting, shown as Visual Summary Data 124. Visual Summary Generation Logic 120 creates Visual Summary Data 124 at least in part by capturing, at different points in time during the online meeting, screenshots of the current visual contents of the online meeting, e.g. from the Live Screen Visual Data 126. In order to capture the screenshots used to generate the Visual Summary Data 124, the disclosed system dynamically determines the value of Inactivity Threshold 123.

In one embodiment, Visual Summary Generation Logic 120 system determines that a new screenshot is to be captured during the online meeting in response to detecting a screen capture trigger condition. One example of a screen capture trigger condition is detecting that a significant change has occurred in the shared screen since the last screenshot was captured. The disclosed system may detect such a trigger condition when a difference between the visual data in the last captured screenshot and the current contents of Live Screen Visual Data 126 increases past a threshold value, shown in FIG. 1 as Maximum Inter-Screenshot Visual Change 127. For example, the pixels in the last screenshot captured may be continuously compared to the pixels in the Live Screen Visual Data 126, and when the number of pixels that are different increases past the threshold (e.g., 5%, 10%, or 25% differing pixels), the trigger condition is detected, and the process for capturing a new screenshot is initiated. In yet another embodiment, the locations of pixels in the Live Screen Visual Data 126 that are different from corresponding pixels in a last captured screenshot are determined, and a trigger condition is detected when a bounding box containing all of the differing pixels increases beyond a threshold (e.g., a maximum area, perimeter, or diagonal size). In still another embodiment, when each of the last captured screenshot and the Live Screen Visual Data 126 is represented by an arrangement (e.g., array) of tiles, the disclosed system detects a trigger condition when a number of tiles in the last captured screenshot that include a pixel that is different from a corresponding pixel in the Live Screen Visual Data 126 increases past a threshold (e.g., 5%, 10%, 25%, or 50% of the tiles).

In one embodiment, the disclosed system dynamically generates new values for the Inactivity Threshold 123 in response to receipt of individual screen update messages after the trigger condition is detected. For example, in one embodiment, the Visual Summary Generation Logic 120 determines a new value for Inactivity Threshold 123 by first determining an average time interval occurring between the arrival times of consecutive, previously received screen update messages, within a set of screen update messages received after the trigger condition. This average time interval is shown in FIG. 1 as Average Screen Update Interval 119. The Visual Summary Generation Logic 120 then sets the Inactivity Threshold 123 to a value that is larger than Average Screen Update Interval 119.

Any specific number of screen update messages may be included in the set of screen update messages used to determine Average Screen Update Interval 119. For example, a fixed number of most recently received screen update messages may be used to determine Average Screen Update Interval 119. Accordingly, the Average Screen Update Interval 119 may be embodied as a moving average, determined across a fixed size "window" of most recently received screen update messages, such that the set of received screen update messages used to determine the Average Screen Update Interval 119 changes each time a new screen update message is received after the trigger condition. The number of screen update messages in each set (also known as the window "size") may, for example, be in the range of most recently received screen update messages. In one embodiment, the number of screen update messages to be included in the set is a tunable parameter, settable by a user.

Until the number of screen update messages received after the trigger condition reaches the number of screen update messages needed for a complete set, the disclosed system may operate using a default value for the Inactivity Threshold 123, such as, for example, a value in the range of 3, 4 or 5 seconds. After the number of screen update messages received following the trigger condition reaches the number of messages needed for a complete set, the disclosed system uses sets of the received screen update messages to dynamically determine the value of Average Screen Update Arrival Interval 119.

The disclosed system may also determine a standard deviation of the time intervals occurring between the arrival times of the screen update messages in the set of received screen update messages, shown as Arrival Interval Standard Deviation 121 in FIG. 1. In one embodiment, the disclosed system also uses Arrival Interval Standard Deviation 121 to dynamically determine the value of the Inactivity Threshold 123. For example, the Visual Summary Generation Logic 120 may determine a value for Inactivity Threshold 123 that is the sum of i) Average Screen Update Arrival Interval 119, and ii) a multiple of Arrival Interval Standard Deviation 121.

In order to prevent incorrect modes of operation, and to limit the time a meeting participant must wait before a new screenshot is captured and added to the visual summary, the Visual Summary Generation Logic 120 may compare each newly generated value for Inactivity Threshold 123 to an upper bound, shown in FIG. 1 as Inactivity Threshold Upper Bound 129. For example, the upper bound may be a predetermined number of seconds (e.g. ten (10) seconds, etc.). The value of Inactivity Threshold Upper Bound 129 may be embodied as a tunable parameter, settable by a user. If the newly generated value for Inactivity Threshold 123 exceeds the upper bound, then Visual Summary Generation Logic 120 ignores the newly generated value, and sets the value of Inactivity Threshold 123 to the upper bound instead.

After a screen update message is received following a trigger condition, the disclosed system waits for a period of time having a duration equal to the value of the Inactivity Threshold 123 before capturing Screenshot 139 from the Live Screen Visual Data 126. During this period of time, the disclosed system determines whether a significant amount of change occurs in the visual data for the online meeting. Only in the event that no change occurs in the visual data for the online meeting during that time period, or in the event that only an insignificant amount of change occurs in the visual data for the online meeting during that time period, does the disclosed system capture the Screenshot 139 from the Live Screen Visual Data 126.

For example, the Visual Summary Generation Logic 120 may wait for a time period equal to the value of the Inactivity Threshold 123, and starting at the arrival time of a most recently received screen update message, e.g. at the arrival time of the screen update message that caused the trigger condition to be detected, and at the arrival time of one or more subsequently received screen update messages until the screenshot is captured. During that time period, Visual Summary Generation Logic 120 determines whether or not a significant visual change occurs in the Live Screen Visual Data 126. For example, a significant visual change in the Live Screen Visual Data 126 may be detected in response to receipt of one or more screen update messages during the time period. If the total amount of visual change occurring in the Live Screen Visual Data 126 during the time period is determined to be significant, the Visual Summary Generation Logic 120 operates to re-start the screenshot capture process based on a screen update message received following the start of the time period, e.g. the screen update message that caused the visual change to be significant.

In one embodiment, Visual Summary Generation Logic 120 determines whether any screen update message is received during the time period having a duration equal to the Inactivity Threshold 123. If such an embodiment, if no screen update message is received during the time period, the system captures Screenshot 139, and stores Screenshot 139 into the Visual Summary Data 124. Otherwise, in the case where a new screen update message is received during that time period, the Visual Summary Generation Logic 120 restarts the screenshot capture process based on a new set of previously received screen update messages, including the newly received screen update message.

In another embodiment, the Visual Summary Generation Logic 120 monitors the screen update messages received during the time period equal to the Inactivity Threshold 123, and compares the total amount of changes indicated by those received screen update messages to a maximum threshold, shown in FIG. 1 as Pre-Capture Maximum Modification 131. The value of Pre-Capture Maximum Modification 131 may be set to any specific percentage of change, or amount of change, permitted to occur in the Live Screen Visual Data 126 during the time period equal to the Inactivity Threshold 123, without preventing a screenshot from being captured. For example, Pre-Capture Maximum Modification 131 may be set to a value representing a maximum number of pixels or tiles, or a maximum percentage of pixels or tiles, that may change in Live Screen Visual Data 126, during the time period equal to the value of the Inactivity Threshold 123, without preventing a screenshot from being captured. Accordingly, if the total amount of visual change occurring in the Live Screen Visual Data 126 during that time period does not exceed Pre-Capture Maximum Modification 131, the Visual Summary Generation Logic 120 captures Screenshot 139 from the Live Screen Visual Data 126, and stores the Screenshot 139 into the Visual Summary Data 124.

In another aspect, Visual Summary Generation Logic 120 operates to detect when a premature screenshot may have been captured. In a first embodiment, after Screenshot 139 is captured, Visual Summary Generation Logic 120 determines whether a significant amount of visual data is received for the online meeting during a time period beginning at the time at which Screenshot 139 was captured. This time period following the capture of Screenshot 139 has a duration equal to the value of Premature Screenshot Threshold 125. In one embodiment, the value of Premature Screenshot Threshold 125 may be set to i) a constant amount of time (e.g. 10 seconds), or alternatively to ii) a sum consisting of a constant amount of time (e.g. a few seconds), plus a multiple of Average Screen Update Arrival Interval 119, plus a multiple of Arrival Interval Standard Deviation 121.

In an alternative embodiment, Visual Summary Generation Logic 120 determines whether a significant amount of visual data is received for the online meeting during a time period that runs concurrently with the time period equal to the Inactivity Threshold 123 (e.g. beginning at the arrival time of the screen update message that caused the trigger condition to be detected), but having a duration equal to the value of Premature Screenshot Threshold 125. In this alternative embodiment, the value of Premature Screenshot Threshold 125 must represent a longer period of time than the value of Inactivity Threshold 123.

In either of the above embodiments, the disclosed system captures Screenshot 139, and adds Screenshot 139 to Visual Summary Data 124, relatively quickly, while still verifying that visual data in Screenshot 139 was not captured prematurely. In this way the disclosed system may be embodied to quickly provide a visual display of a captured screenshot that reflects a recent change in live online meeting visual content, while still operating to effectively detect and replace prematurely captured screenshots.

In either of the above embodiments, the time period having a duration equal to the value of Premature Screenshot Threshold 125 may be referred to as the "premature screenshot threshold time period."

If a significant change occurs in Live Screen Visual Data 126 during the premature screenshot threshold time period, then Visual Summary Generation Logic 120 determines that Screenshot 139 was captured prematurely. The Visual Summary Logic 120 may determine whether a significant change occurs in Live Screen Visual Data 126 by determining whether a screen update message is received during that time period. If no screen update messages are received, the system determines that Screenshot 139 was not captured prematurely. Otherwise, in the case where a screen update message is received during the premature screenshot threshold time period, the Visual Summary Generation Logic 120 determines that Screenshot 139 was captured prematurely, and restarts the screenshot capture process based on a new set of most recently received screen update messages, including the screen update message received during the time period having a duration equal to the value of the Premature Capture Threshold 125.

The Visual Summary Generation Logic 120 may alternatively monitor all screen update messages received by the Viewer Computing Device 100 during the premature screenshot threshold time period, and compare the total amount of changes indicated by those received screen update messages to a maximum threshold, shown in FIG. 1 as Post-Capture Maximum Modification 133. The value of Post-Capture Maximum Modification 133 may be set to any specific percentage of change, or amount of change, permitted to occur in the Live Screen Visual Data 126 during the premature screenshot threshold time period without causing a determination that the previously captured screen shot was captured prematurely. For example, Post-Capture Maximum Modification 133 may be set to a value representing a maximum number of pixels or tiles, or a maximum percentage of pixels or tiles, that may change in Live Screen Visual Data 126, during the premature screenshot threshold time period, without causing a determination that the previously captured screenshot was captured prematurely. Accordingly, if the total amount of visual change occurring in the Live Screen Visual Data 126 during the premature screenshot threshold time period exceeds Post-Capture Maximum Modification 133, the Visual Summary Generation Logic 120 determines that Screenshot 139 was captured prematurely. In response to determining that Screenshot 139 was captured prematurely, the Visual Summary Generation Logic 120 restarts the screenshot capture process based on a new set of most recently received screen update messages, in order to capture another screenshot that is then used to replace the Screenshot 127 in the Visual Summary Data 124.

Visual Summary Generation Logic 120 may generate the value of Premature Screenshot Threshold 125 as a sum of i) Average Screen Update Arrival Interval 119, and ii) a multiple of Arrival Interval Standard Deviation 121. However, in an embodiment in which the value of Premature Screenshot Threshold 125 must represent a longer period of time than the value of Inactivity Threshold 123, the multiple of Arrival Interval Standard Deviation 121 that is used to determine the value of Premature Screenshot Threshold 125 must be larger than the multiple of Arrival Interval Standard Deviation 121 used to determine the value of Inactivity Threshold 123. The value of Inactivity Threshold 123 may accordingly be determined using a multiple of Arrival Interval Standard Deviation 121 obtained by multiplying Arrival Interval Standard Deviation 121 by Pre-Capture Inactivity Factor 135, while the value of the Premature Screenshot Threshold 125 may be determined using a multiple of Arrival Interval Standard Deviation 121 obtained by multiplying Arrival Interval Standard Deviation 121 by a Post-Capture Inactivity Factor 137, where the Post-Capture Inactivity Factor 137 may have a value that is significantly larger than the value of the Pre-Capture Inactivity Factor 135. For example, in certain operational environments, a Pre-Capture Inactivity Factor 135 may be effective within the range of 1-10. In the case where the Pre-Capture Inactivity Factor 135 has a value of 5, an effective value for Post-Capture Inactivity Factor 137 may, for example, be 20. Those skilled in the art will recognize that various other specific values of the Pre-Capture Inactivity Factor 135 and Post-Capture Inactivity Factor 137 may be used. The specific values of Pre-Capture Inactivity Factor 135 and Post-Capture Inactivity Factor 137 may be embodied as tunable parameters, accessible and settable by a user.

Those skilled in the art will recognize that the Viewer Computing Device 100 and Presenter Computing Device 104 may be embodied using any specific type of client computing device, such as personal computer, laptop computer, tablet computer, smart phone, personal digital assistant, Windows terminal device, network computer, internet appliance, information appliance, workstation, mini-computer, or other computing device that is capable of both presenting information/data to, and receiving commands from, a user thereof. For example, each of the Viewer Computing Devices 100 and/or the Presenter Computing Device 104 may include a visual display device (e.g. Display Device 116), a data entry device (e.g., a keyboard), persistent and/or volatile storage (e.g., Memory 114), one or more processors (e.g. Processing Circuitry 112), and a mouse.

The Server Computing Device 106 may be embodied as any type of computing device capable of receiving information/data from and delivering information/data to (e.g., over the Network 102) one or more viewer computing devices including Viewer Computing Device 100, and the Presenter Computing Device 104. For example, the Server Computing Device 106 may be a computer or computer appliance having computer memory for storing computer-readable instructions, and one or more processing units for executing such instructions.

The Network 102 may be made up of one or more communication networks and/or computer networks that allow computers to exchange data. Such networks may, for example, include or consist of one or more Local Area Networks (LANs), Wireless Local Area Networks (WLANs), Wide Area Networks (WANs), e.g. the Internet, and/or any other specific type of network. The Viewer Computing Devices 100, Presenter Computing Device 104, and Server Computing Device 106, may communicate through Network 102 using one or more communication protocols including, but not limited to, Hypertext Transfer Protocol (HTTP), Transmission Control Protocol (TCP), Internet Protocol (IP), Ethernet, Wi-Fi, and/or any other specific communication protocol. Accordingly, screen update messages in Online Meeting Visual Data 108 may be embodied using any specific type or format of message conveyed over Network 102, as may be appropriate for a particular network or protocol in a given embodiment.

Figure 2:
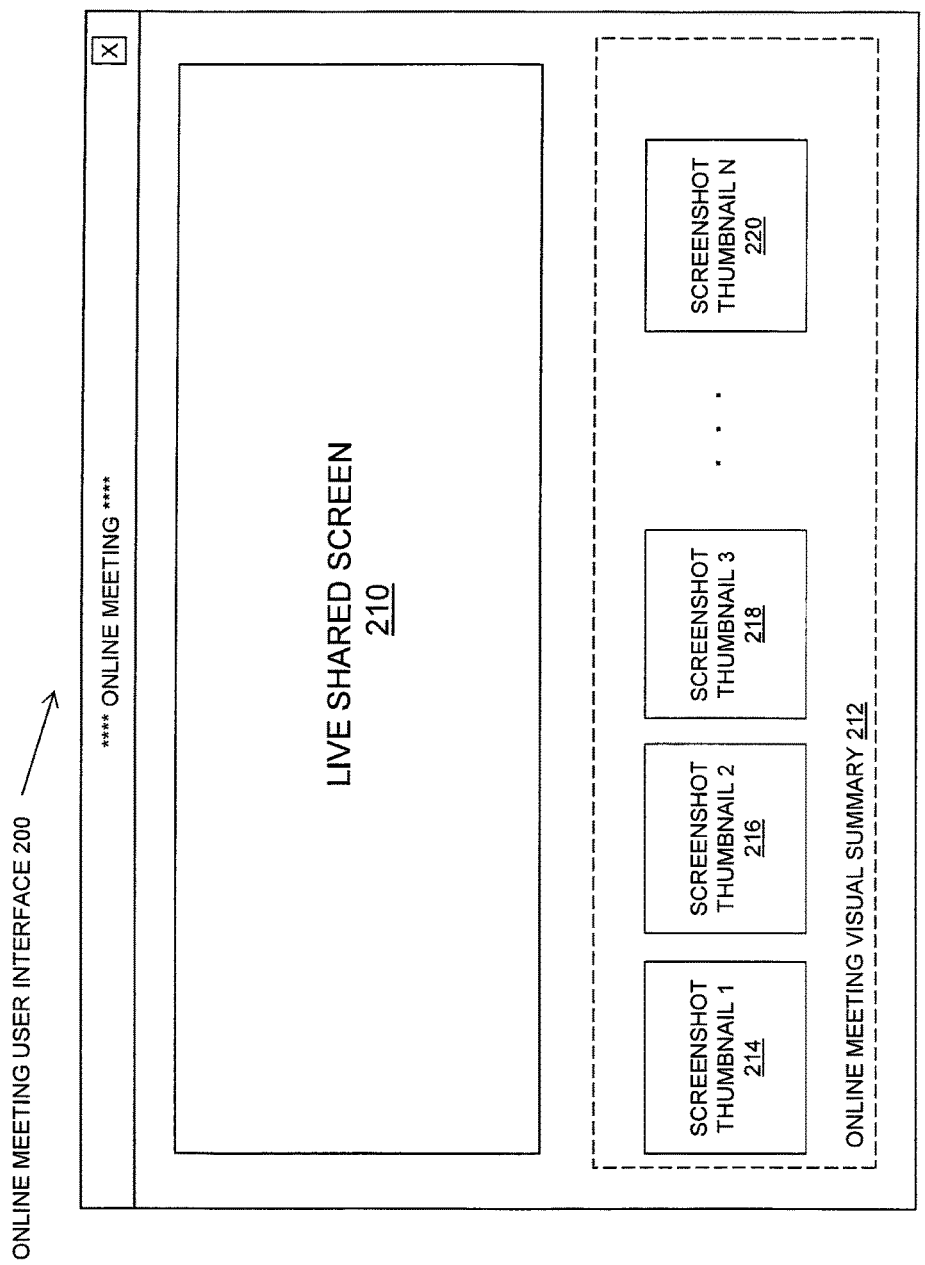
FIG. 2 is a simplified depiction of a user interface window provided at a viewer computing device by an illustrative embodiment of the disclosed system to an online meeting participant.

FIG. 2 is a simplified depiction of a user interface window provided at a viewer computing device by an illustrative embodiment of the disclosed system to an online meeting participant. As shown in FIG. 2, an Online Meeting User Interface 200 may include the following display elements: i) a Live Shared Screen 210, and ii) an Online Meeting Visual Summary 212. The Online Meeting User Interface 200 is, for example, generated by the Online Meeting User Interface Logic 118 shown in FIG. 1, and displayed in the Display Device 116 of the Viewer Computing Device 100. The Live Shared Screen 210 contains a current view of presentation data being shared from the Presenter Computing Device 104 in a shared screen provided by online meeting application program code during the online meeting. Accordingly, the Live Shared Screen 210 displays screen data received by the Viewer Computing Device 100 during the online meeting, such as a slide show, application user interface demonstration, etc. The screen data used by Online Meeting User Interface Logic 118 to generate Live Shared Screen 210 may, for example, be pixel data or representations of pixel data read from the Live Screen Visual Data 126.

Online Meeting Visual Summary 212 may contain thumbnail representations of previously captured screenshots, shown in FIG. 2 as Screenshot Thumbnail 1 214, Screenshot Thumbnail 2 216, Screenshot Thumbnail 3 218, through Screenshot Thumbnail N 220. The thumbnail representations in the Online Meeting Visual Summary 212 are an example of how previously captured screenshots may be displayed in a graphical depiction of a visual summary of an online meeting, where the visual summary is generated using a series of screenshots captured from a shared screen of an online meeting at different points in time during the online meeting.

Online Meeting Visual Summary 212 may be generated by the Online Meeting User Interface Logic 118 using the Visual Summary Data 124. For example, in one embodiment, each captured screenshot is stored in the Visual Summary Data 124 as a corresponding thumbnail image, where the thumbnail image is a scaled-down version of the corresponding screenshot.

Each thumbnail image in Online Meeting Visual Summary 212 represents a preceding point in time during the online meeting at which the corresponding screenshot was captured. For example, the thumbnail images may be arranged in temporal sequence from left to right, such that the leftmost displayed thumbnail (e.g. Screenshot Thumbnail 1 214) represents the screenshot captured at the earliest point in time during the online meeting (e.g. the first captured screenshot), the next thumbnail to the right (Screenshot Thumbnail 2 216) represents the next subsequently captured screenshot, and so on through the rightmost thumbnail (Screenshot Thumbnail N 220), which represents the most recently captured screenshot. An online meeting attendee using Viewer Computing Device 112 may accordingly scroll through the thumbnails in Online Meeting Visual Summary 212 in order to find representations of the shared screen corresponding to earlier points in time during the online meeting. In some embodiments of the disclosed system, a meeting attendee can navigate through a recording of the online meeting using the thumbnails in Online Meeting Visual Summary 212. In such an embodiment, the meeting attendee can select (e.g. click on) one of the thumbnails to cause the recording of the online meeting to begin re-playing recorded screen data from the online meeting beginning at the point in time during the online meeting at which the screenshot corresponding to the thumbnail was captured.

While the example of the Online Meeting User Interface 200 in FIG. 2 shows the Online Meeting Visual Summary 212 displayed during the online meeting, simultaneously with the Live Shared Screen 210 through which the visual data for the online meeting is displayed during the online meeting, the disclosed system is not limited to such an embodiment. For example, the Online Meeting Visual Summary 212 may alternatively be part of a user interface for navigating a recording of the online meeting that is displayed after the online meeting has been completed. Similarly, while thumbnail representations of previously captured screenshots are used in the embodiment shown in FIG. 2, the disclosed system is also not so limited. Alternatively, for example, the complete, unreduced captured screenshots may be displayed within the Online Meeting Visual Summary 212.

Figure 3:
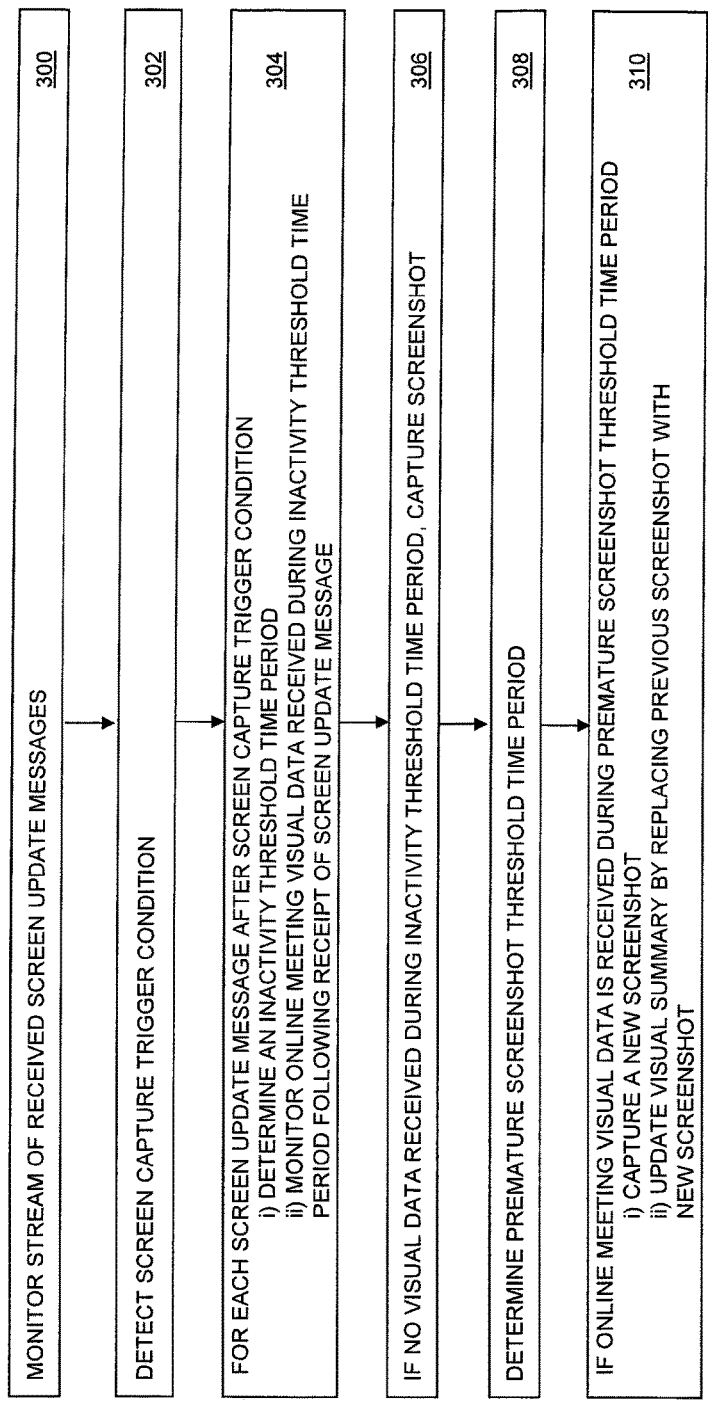
FIG. 3 is a flow chart showing steps performed to capture a screenshot for a visual summary of an online meeting in an illustrative embodiment of the disclosed system.

FIG. 3 is a flow chart showing steps performed to capture a screenshot for a visual summary of an online meeting in an illustrative embodiment of the disclosed system. The steps shown in FIG. 3 may be performed by online meeting application software executing on a client system, such as the Visual Summary Generation Logic 120 shown in FIG. 1. Alternatively, the steps shown in FIG. 3 may be performed by online meeting application components executing in the Presenter Computing Device 104, and/or in the Server Computing Device 106 shown in FIG. 1, in order to capture screenshots for an online meeting visual summery generated at one of those devices.

At step 300, the disclosed system monitors a stream of received screen update messages (e.g. Online Meeting Visual Data 108 in FIG. 1). At step 302, the disclosed system detects a screen capture trigger condition, such a significant change in the visual data displayed in a shared screen displayed to meeting participants during the online meeting. In response to detecting the trigger condition at step 302, at step 304 the disclosed system dynamically determines an inactivity threshold time period for each of one or more subsequently received screen update messages. The disclosed system monitors a stream of received online meeting visual data during the inactivity threshold time period following the receipt of a most recently received screen update message, and determines at step 306 whether a significant amount of visual data is received for the online meeting during the inactivity threshold time period. For example, the disclosed system may operate at step 306 to determine whether any screen update messages are received during the inactivity threshold time period following a most recently received screen update message. If no screen update messages are received during the inactivity threshold time period following the most recently received screen update message, the disclosed system captures a screenshot of the current state of the visual data being shared through the online meeting (e.g. from Live Screen Visual Data 126 shown in FIG. 1). Otherwise, if a significant amount of visual data is received during the inactivity threshold time period (e.g. one or more screen update messages), the disclosed system re-starts the screen capture process based on a new most recently received screen update message (e.g. received during the inactivity threshold time period), thus repeating steps 304 and 306 until at step 306 a screenshot is captured.

At step 308 the disclosed system determines a premature screenshot threshold time period. In an embodiment in which the premature screenshot threshold time period begins at the time the screenshot is captured, the duration of the premature screenshot threshold time period may be set to a constant amount of time (e.g. 10 seconds), or it may be set to a sum of a constant amount of time (e.g. a few seconds), plus a multiple of the average screen update arrival interval, plus a multiple of the arrival interval standard deviation. Alternatively, in an embodiment in which the premature screenshot threshold time period runs concurrently with the inactivity threshold time period (i.e. begins at the same time that the inactivity threshold time period begins), then the premature screenshot threshold time period determined at step 308 must have a duration greater than that of the inactivity threshold time period determined at step 304. In either case, the disclosed system operates to capture, store and potentially display screenshots relatively quickly, while still determining whether each captured screenshot was captured prematurely.

Further at step 308, the disclosed system may compare the duration of each newly generated premature screenshot threshold time period to an upper bound. For example, the upper bound may be a predetermined number of seconds (e.g. ten (10) seconds, etc.), and may be embodied as a tunable parameter, settable by a user. If the duration of the newly generated premature screenshot threshold time period exceeds the upper bound, then the disclosed system ignores the newly generated value, and sets the premature screenshot threshold time period duration to the upper bound instead.

At step 310, the disclosed system monitors the stream of received online meeting visual data during the premature screenshot threshold time period (e.g. following the capture of the screenshot at step 306), and further determines at step 310 whether a significant amount of visual data is received for the online meeting prior to the end of the premature screenshot threshold time period. For example, the disclosed system may operate at step 310 to determine whether any screen update messages are received during the premature screenshot threshold time period following the capture of the screenshot at step 306. If no screen update messages are received during the premature screenshot threshold time period following the capture of the screenshot at step 306, the disclosed system determines that the screenshot was not captured prematurely. Otherwise, if a significant amount of visual data is received during the premature screenshot threshold time period (e.g. one or more screen update messages), the previously captured screenshot was captured prematurely. Accordingly, further at step 310, the disclosed system re-starts the screen capture process with a new most recently received screen update message (e.g. received during the premature screenshot threshold time period), and repeats steps 304 and 306 as needed using subsequently received screen update messages until at step 306 a new screenshot is captured. The new captured screenshot is then used to update the visual summary by replacing the prematurely captured screenshot. In an embodiment in which a representation of the prematurely captured screenshot was previously displayed within the Online Meeting Visual Summary 212 or the like, the representation of the prematurely captured screenshot is replaced with a representation of the newly captured screenshot.

Figure 4:
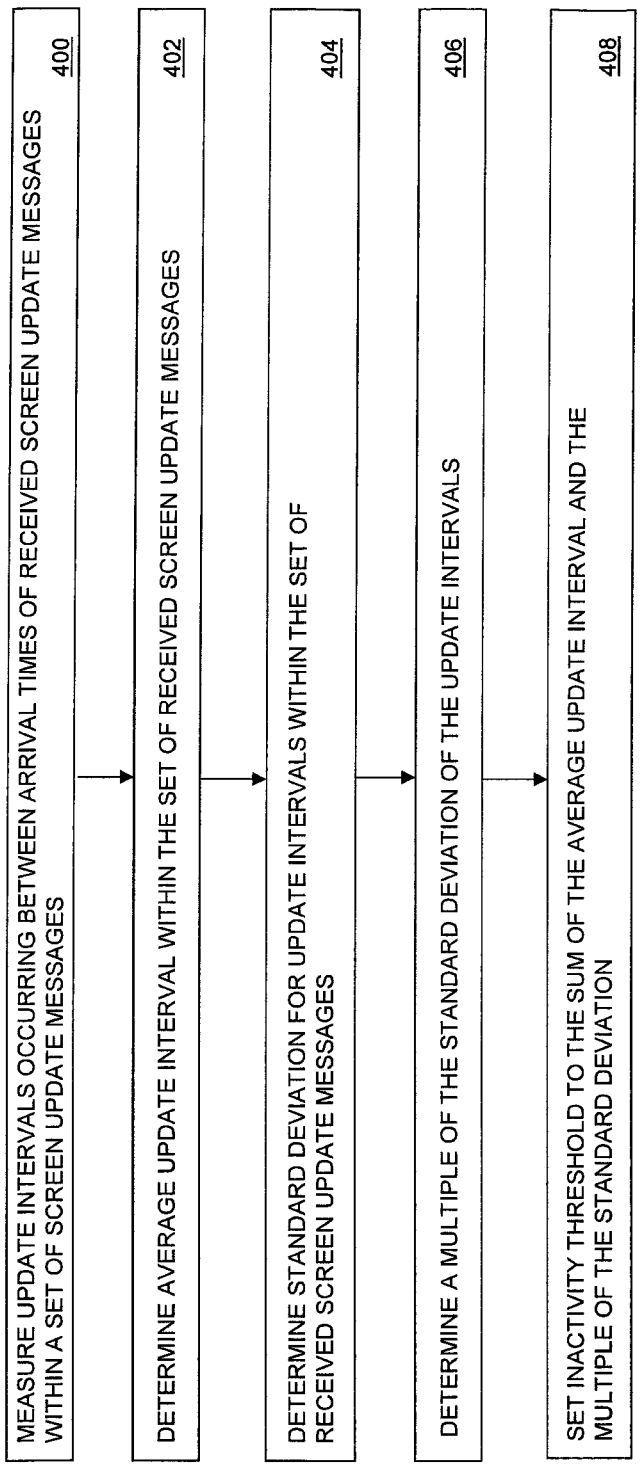
FIG. 4 is a flow chart showing steps performed to generate an inactivity threshold in an illustrative embodiment of the disclosed system.

FIG. 4 is a flow chart showing steps performed to generate an inactivity threshold in an illustrative embodiment of the disclosed system. The steps of FIG. 4 are an example of how an embodiment of the disclosed system may determine the inactivity threshold time period during step 304 of FIG. 3.

At step 400, the disclosed system measures the time intervals ("update intervals") occurring between arrival times of consecutively received screen update messages within a set of most recently received screen update messages. The set of most recently received screen update messages is a sliding window containing a predetermined number of most recently received screen update messages. For example, the number of screen update messages in the set of most recently received screen update messages may be a user settable number. An effective value for the number of screen update messages in the set may, for example, be in the range of 5-10. At step 402, the disclosed system determines an average of the update intervals measured at step 400. At step 404, the disclosed system determines a standard deviation of the update intervals measured at step 400. At step 406, the disclosed system determines a multiple of the standard deviation determined at step 404. For example, a multiple of the standard deviation may be determined at step 406 by multiplying the standard deviation determined at step 404 by a pre-determined factor, e.g. Pre-Capture Inactivity Factor 135 shown in FIG. 1. At step 408 the inactivity threshold is set to a value equal to the sum of the average update interval determined at step 402 and the multiple of the update interval standard deviation determined at step 408.

Figure 5:
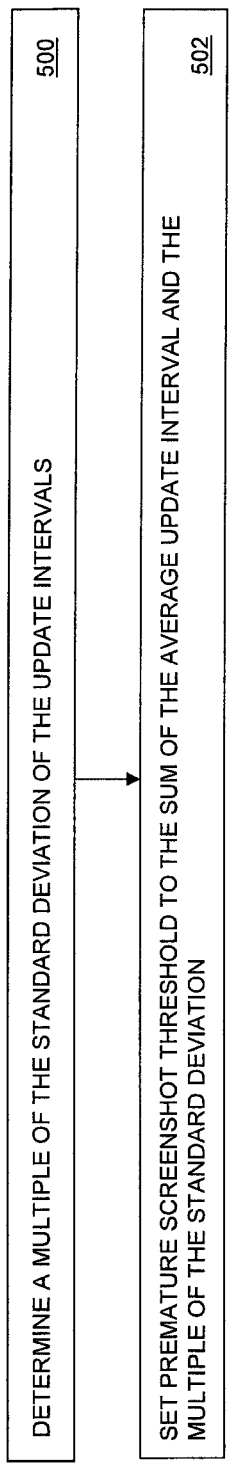
FIG. 5 is a flow chart showing steps performed to generate a premature screenshot threshold in an illustrative embodiment of the disclosed system.

FIG. 5 is a flow chart showing steps performed to generate a premature screenshot threshold in an illustrative embodiment of the disclosed system. The steps of FIG. 5 are an example of how an embodiment of the disclosed system may determine the premature screenshot threshold time period in step 308 of FIG. 3. At step 500, the disclosed system determines a multiple of the standard deviation determined at step 404 in FIG. 4. For example, a multiple of the standard deviation may be determined at step 500 by multiplying the standard deviation determined at step 404 by a pre-determined factor, e.g. Post-Capture Inactivity Factor 137 shown in FIG. 1. At step 502 the premature screenshot threshold is set to a value equal to the sum of the average update interval determined at step 402 of FIG. 4 and the multiple of the update interval standard deviation determined at step 500. Setting the premature screenshot threshold to a value equal to the sum of the average update interval and a multiple of the update interval standard deviation is only one example of how the value of the premature screenshot threshold may be set. Alternatively, the premature screenshot threshold may be set to a constant amount of time (e.g. 10 seconds), or to a value based on a constant amount of time (e.g. a few seconds), a multiple of Average Screen Update Arrival Interval 119, and/or a multiple of Arrival Interval Standard Deviation 121.

Figure 6:
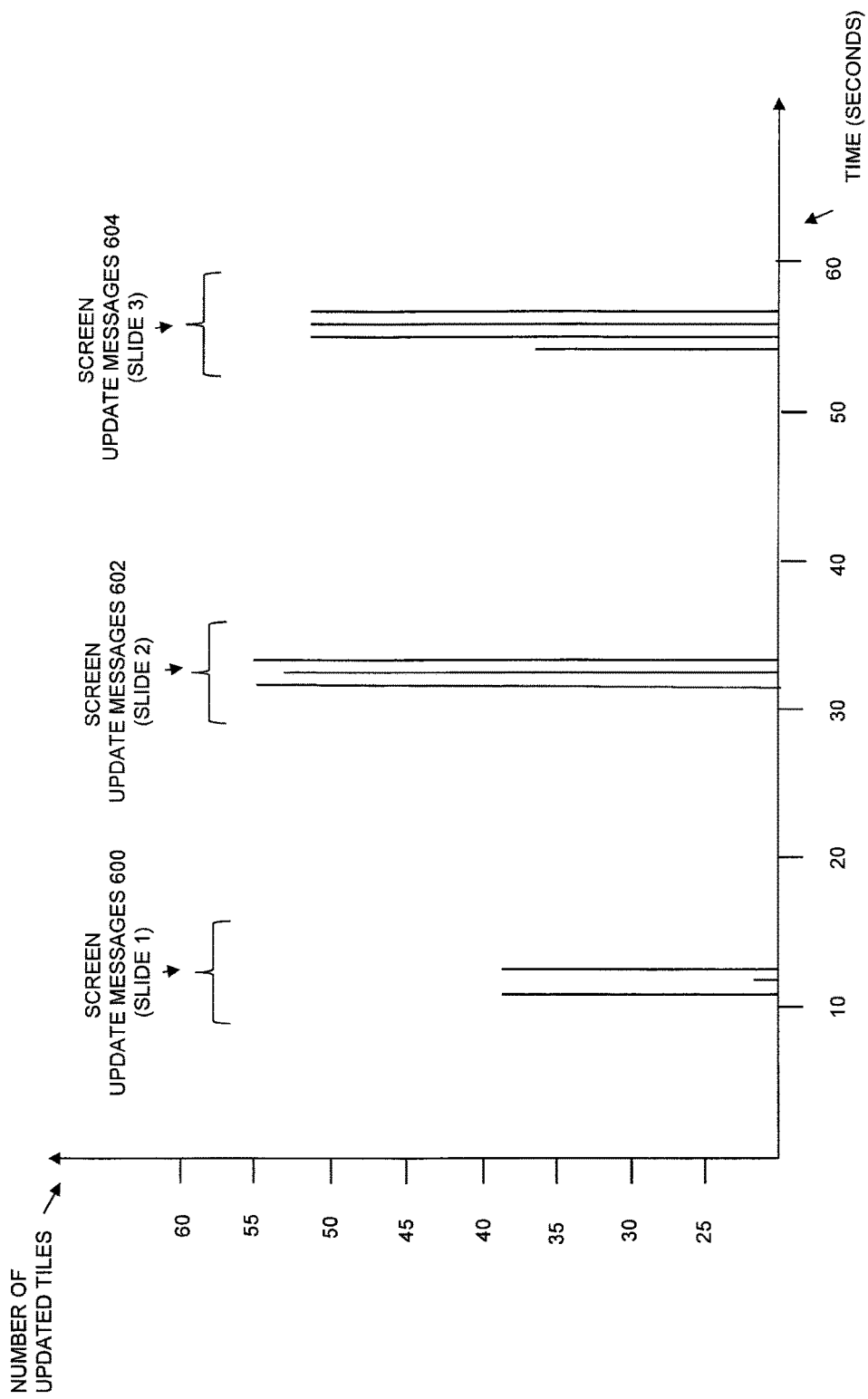
FIG. 6 is a graph showing the arrival times for received screen update messages conveying visual data for an online meeting, in which a slide presentation is displayed in a shared screen.

FIG. 6 is a graph showing the arrival times for received screen update messages conveying visual data for an online meeting, in which a slide presentation is displayed in a shared screen. As shown in FIG. 6, Screen Update Messages 600 convey the changed screen data necessary to display a first slide ("Slide 1") in a shared screen provided during an online meeting. Similarly, Screen Update Messages 602 convey the changed screen data necessary to display a second slide ("Slide 2"), and Screen Update Messages 604 convey the changed screen data necessary to display a third slide ("Slide 3"). FIG. 6 illustrates how certain types of online meeting visual data (e.g. a slideshow), are "bursty", in that the visual data is received at the remote client systems as bursts of screen update messages (e.g. where each burst corresponds to a slide in the slideshow), and with significant periods of inactivity occurring between the bursts. The disclosed system is particularly advantageous for use in online meetings that share such types of "bursty" visual information.

During operation of an embodiment of the disclosed system, an initial screen update message for each of the slides shown in FIG. 6 would result in detection of a trigger condition, indicating that a new screenshot should be captured. The disclosed system would then dynamically determine an inactivity threshold time period based on the time intervals between the arrival times of screen update messages within a set of screen update messages received after the trigger condition, e.g. subsequent screen update messages containing updated tiles for the new slide. The dynamically determined inactivity threshold time period would then be used to delay capturing the screenshot, in order to prevent capturing the screenshot prior to receipt of all (or at least substantially all) of the screen update messages for the slide. After the screenshot was captured, the disclosed system then checks for screen update messages received after the screenshot was captured, during the premature screenshot time period, in order to confirm that the screenshot was captured prior to receipt of all (or at least substantially all) of the last screen update message for the slide. In this way, an embodiment of the disclosed system effectively generates a visual summary of a slide presentation, such that the visual summary contains a screenshot representing each slide in the presentation, and in which each screenshot accurately captures the visual data for a corresponding slide by capturing the live screen data only after receipt of the complete (or at least substantially complete) set of screen update messages conveying the updated tiles for the slide.

Those skilled in the art will recognize that the disclosed system is significantly more than merely the abstract idea of creating a visual summary for a meeting. Instead, the disclosed system addresses various specific shortcomings arising in previous technical solutions, including shortcomings arising from the use of fixed delay periods while capturing screenshots for use in visual summaries of online meetings. The disclosed system advantageously provides improved screenshot capture and display for online meeting participants connecting through networks having varied and/or varying performance levels, and/or with end user systems having varied and/or varying performance characteristics. The disclosed system may accomplish these improvements by dynamically determining delay periods for use when capturing screenshots based on the arrival times of screen update messages. Using the techniques disclosed herein, captured screenshot representations may advantageously be displayed in close temporal proximity to corresponding visual data within a display of the online meeting itself, while avoiding capture of screenshots containing transitional visual data. These advantages are, for example, applicable when capturing screenshots during an online meeting for use in a visual summary of the online meeting that is displayed to meeting attendees while the online meeting is occurring.

The techniques disclosed herein also address shortcomings of previous solutions related to setting or selecting appropriate values for the fixed delay periods used by previous technical solutions. The disclosed system may advantageously reduce or eliminate problems arising from the previous use of relatively short fixed time delays, such as extracting visual data prior to completion of a change in the visual data, as may occur when using previous systems under conditions of poor network performance, and/or when experiencing limited resource availability on a participant's local client system. Additionally, the techniques disclosed herein may reduce or eliminate problems arising in previous systems from using relatively long fixed time delays, such as capturing and displaying screenshots long after the corresponding visual data was displayed as part of the live online meeting, as may occur in previous systems under conditions of relatively high network and/or client system performance. The disclosed system also improves over previous solutions through its techniques for detecting a premature capture of a screenshot.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of generating screenshots for a visual summary of an online meeting, comprising executing on a processor the steps of:

monitoring a stream of received screen update messages associated with the online meeting, wherein each received screen update message modifies a portion of a shared screen provided as part of the online meeting;

detecting a screenshot capture trigger condition by, at least in part, detecting that an amount that the shared screen has been modified since a last screenshot of the shared screen was captured exceeds a maximum inter-screenshot visual change, in response to detecting the screenshot capture trigger condition, for each screen update message received after the screenshot capture trigger condition is detected until a screenshot is captured for the visual summary of the online meeting, dynamically generating an inactivity threshold, wherein the generating comprises
  i) measuring a plurality of update intervals, wherein each of the update intervals comprises a time period between the arrival times of two consecutively received screen update messages within a set of screen update messages received after the screenshot capture trigger condition is detected, wherein the set of screen update messages received after the screenshot capture trigger condition is detected comprises a predetermined number of most recently received screen update messages,
  ii) determining an average update interval comprising an average of the measured update intervals, and
  iii) setting the inactivity threshold to a value greater than the average update interval;

starting a time period equal in duration to the inactivity threshold at an arrival time of a most recently received screen update message;

determining whether an amount of the shared screen modified during the time period equal in duration to the inactivity threshold exceeds a pre-capture maximum modification;

capturing a screenshot of the shared screen in response to a determination that the amount of said shared screen modified during the time period equal in duration to the inactivity threshold does not exceed the pre-capture maximum modification amount; and storing the captured screenshot in the visual summary of the online meeting.

2. The method of claim 1, wherein dynamically generating the inactivity threshold further comprises determining an update interval standard deviation comprising a standard deviation of the measured update intervals; and
wherein setting the inactivity threshold to a value greater than the average update interval comprises setting the inactivity threshold to a sum of i) the average update interval, and ii) a multiple of the update interval standard deviation.

3. The method of claim 2, further comprising:
after capturing the screenshot of the shared screen, in response to receiving at least one screen update message during a time period equal in duration to a premature screenshot threshold, and wherein the at least one received screen update message modifies more than a post-capture maximum amount of the shared screen, i) capturing a new screenshot of the shared screen and ii) updating the visual summary of the online meeting by replacing the previously captured screenshot with the new screenshot.

4. The method of claim 3, further comprising dynamically generating the premature screenshot threshold, at least in part by setting the premature screenshot threshold to a sum of i) the average update interval, and ii) a second multiple of the update interval standard deviation.

5. The method of claim 4, wherein the step of dynamically generating the inactivity threshold includes determining the multiple of the update interval standard deviation by multiplying the update interval standard deviation by a pre-capture inactivity factor;
wherein the step of dynamically determining the premature screenshot threshold includes determining the second multiple of the update interval standard deviation by multiplying the update interval standard deviation by a post-capture checking factor; and
wherein the post-capture checking factor has a larger value than the pre-capture inactivity factor.

6. The method of claim 1, wherein the step of dynamically generating the inactivity threshold includes comparing the inactivity threshold to an upper bound value, and, in the event that the inactivity threshold exceeds the upper bound value, setting the inactivity threshold to the upper bound value.

7. The method of claim 1, wherein the step of determining whether the amount of the shared screen modified during the time period equal in duration to the inactivity threshold exceeds the pre-capture maximum modification determines that the amount of the shared screen modified during the time period equal in duration to the inactivity threshold exceeds the pre-capture maximum modification in the event that any screen update messages are received during the time period equal in duration to the inactivity threshold.

8. A system for generating screenshots for a visual summary of an online meeting, comprising:
at least one processor;
a memory having program code stored thereon, wherein the program code, when executed by the processor, causes the processor to
  monitor a stream of received screen update messages associated with the online meeting, wherein each received screen update message modifies a portion of a shared screen provided as part of the online meeting;
  detect a screenshot capture trigger condition by, at least in part, causing the processor to detect that an amount that the shared screen has been modified since a last screenshot of the shared screen was captured exceeds a maximum inter-screenshot visual change;
  in response to detection of the screenshot capture trigger condition, for each screen update message received after the screenshot capture trigger condition is detected until a screenshot is captured for the visual summary of the online meeting, dynamically generate an inactivity threshold, at least in part by
    i) measuring a plurality of update intervals, wherein each of the update intervals comprises a time period between the arrival times of two consecutively received screen update messages within a set of screen update messages received after the screenshot capture trigger condition is detected, wherein the set of screen update messages received after the screenshot capture trigger condition is detected comprises a predetermined number of most recently received screen update messages,
    ii) determining an average update interval comprising an average of the measured update intervals, and iii) setting the inactivity threshold to a value greater than the average update interval;

start a time period equal in duration to the inactivity threshold at an arrival time of a most recently received screen update message;

determine whether an amount of the shared screen modified during the time period equal in duration to the inactivity threshold exceeds a pre-capture maximum modification;

capture a screenshot of the shared screen in response to a determination that the amount of said shared screen modified during the time period equal in duration to the inactivity threshold does not exceed the pre-capture maximum modification amount; and store the captured screenshot in the visual summary of the online meeting.

9. The system of claim 8, wherein the program code, when executed by the processor, causes the processor to dynamically generate the inactivity threshold at least in part by:

determining an update interval standard deviation comprising a standard deviation of the measured update intervals; and setting the inactivity threshold to a value greater than the average update interval by setting the inactivity threshold to a sum of i) the average update interval, and ii) a multiple of the update interval standard deviation.

10. The system of claim 9, wherein the program code, when executed by the processor, further causes the processor to:

after the screenshot of the shared screen is captured, in response to receipt of at least one screen update message during a time period equal in duration to a premature screenshot threshold, and wherein the at least one received screen update message modifies more than a post-capture maximum amount of the shared screen, i) capture a new screenshot of the shared screen and ii) update the visual summary of the online meeting by replacing the previously captured screenshot with the new screenshot.

11. The system of claim 10, wherein the program code, when executed by the processor, further causes the processor to dynamically generate the premature screenshot threshold, at least in part by setting the premature screenshot threshold to a sum of i) the average update interval, and ii) a second multiple of the update interval standard deviation.

12. The system of claim 11, wherein the program code, when executed by the processor, further causes the processor to:

dynamically generate the inactivity threshold by determining the multiple of the update interval standard deviation by multiplying the update interval standard deviation by an pre-capture inactivity factor;

dynamically determine the premature screenshot threshold by determining the second multiple of the update interval standard deviation by multiplying the update interval standard deviation by a post-capture checking factor; and wherein the post-capture checking factor has a larger value than the pre-capture inactivity factor.

13. The system of claim 8, wherein the program code, when executed by the processor, further causes the processor to dynamically generate the inactivity threshold by, at least in part, comparing the inactivity threshold to an upper bound value, and, in the event that the inactivity threshold exceeds the upper bound value, setting the inactivity threshold to the upper bound value.

14. The system of claim 8, wherein the program code, when executed by the processor, further causes the processor to determine whether the amount of the shared screen modified by any screen update messages received during the time period equal in duration to the inactivity threshold exceeds the pre-capture maximum modification by determining that the amount of the shared screen modified by any screen update messages received during the time period equal in duration to the inactivity threshold exceeds the pre-capture maximum modification in the event that any screen update messages are received during the time period equal in duration to the inactivity threshold.

15. A non-transitory computer readable medium for generating screenshots for a visual summary of an online meeting, comprising instructions stored thereon, that when executed on a processor, perform the steps of:

monitoring a stream of received screen update messages associated with the online meeting, wherein each received screen update message modifies a portion of a shared screen provided as part of the online meeting;

detecting a screenshot capture trigger condition by, at least in part, detecting that an amount that the shared screen has been modified since a last screenshot of the shared screen was captured exceeds a maximum inter-screenshot visual change;

in response to detecting the screenshot capture trigger condition, for each screen update message received after the screenshot capture trigger condition is detected until a screenshot is captured for the visual summary of the online meeting, dynamically generating an inactivity threshold, wherein the generating comprises i) measuring a plurality of update intervals, wherein each of the update intervals comprises a time period between the arrival times of two consecutively received screen update messages within a set of screen update messages received after the screenshot capture trigger condition is detected, wherein the set of screen update messages received after the screenshot capture trigger condition is detected comprises a predetermined number of most recently received screen update messages, ii) determining an average update interval comprising an average of the measured update intervals, and iii) setting the inactivity threshold to a value greater than the average update interval;

starting a time period equal in duration to the inactivity threshold at an arrival time of a most recently received screen update message;

determining whether an amount of the shared screen modified during the time period equal in duration to the inactivity threshold exceeds a pre-capture maximum modification;

capturing a screenshot of the shared screen in response to a determination that the amount of said shared screen modified by the screen update messages received during the time period equal in duration to the inactivity threshold does not exceed the pre-capture maximum modification amount; and storing the captured screenshot in the visual summary of the online meeting.

* * * * *